United States Patent
Huang

(10) Patent No.: US 11,632,011 B2
(45) Date of Patent: Apr. 18, 2023

(54) CANNED MOTOR DEVICE WITH FIXED SEAT AND STEPPED BASE

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 70 days.

(21) Appl. No.: 17/355,704

(22) Filed: Jun. 23, 2021

(65) Prior Publication Data

US 2022/0416611 A1 Dec. 29, 2022

(51) Int. Cl.
*H02K 5/18* (2006.01)
*H02K 9/22* (2006.01)
*H02K 9/06* (2006.01)
*H02K 5/02* (2006.01)

(52) U.S. Cl.
CPC ............... *H02K 5/18* (2013.01); *H02K 5/02* (2013.01); *H02K 9/06* (2013.01); *H02K 9/22* (2013.01)

(58) Field of Classification Search
CPC .. H02K 5/18; H02K 5/02; H02K 5/20; H02K 5/203; H02K 9/06; H02K 9/22
USPC .............................................. 310/52, 89, 91
See application file for complete search history.

(56) References Cited

U.S. PATENT DOCUMENTS

| | | | | |
|---|---|---|---|---|
| 2009/0026857 A1* | 1/2009 | Lavall | ............ | H02K 5/203 |
| | | | | 310/58 |
| 2014/0091652 A1* | 4/2014 | Dragon | ............ | H02K 5/225 |
| | | | | 310/59 |
| 2018/0262094 A1* | 9/2018 | Blankemeier | .... | H02K 49/106 |
| 2019/0345956 A1* | 11/2019 | Iizuka | ........... | F04D 29/5806 |

FOREIGN PATENT DOCUMENTS

CN 109578291 A * 4/2019 ......... F04D 13/0606

OTHER PUBLICATIONS

Machine translation of CN-109578291-A. (Year: 2019).*

* cited by examiner

*Primary Examiner* — Michael Andrews
(74) *Attorney, Agent, or Firm* — Lando & Anastasi, LLP

(57) ABSTRACT

A canned motor device includes a base, a fixed seat, a motor unit and a motor cover. Each of the base and the fixed seat is formed in a shape of a hollow cylinder that surrounds an axis. The base has an inner base surface surrounding the axis and defining an accommodating space. The fixed seat is disposed in the accommodating space and has an inner seat surface, an outer seat surface, a plurality of recesses and a plurality of first heat-dissipating fins. The recesses are indented from the outer seat surface and extend toward the inner seat surface. Each of the first heat-dissipating fins is located between two adjacent ones of the recesses.

3 Claims, 5 Drawing Sheets

CANNED MOTOR DEVICE WITH FIXED SEAT AND STEPPED BASE

FIELD

The disclosure relates to a canned motor device, and more particularly to a canned motor device with enhanced heat-dissipation efficiency.

BACKGROUND

A conventional canned motor device disclosed in Taiwanese Patent No. M577069 includes a base, a fixed seat, a motor unit, a motor cover and a heat-dissipating cover. The base is made of plastic materials, and includes a covering member and a main body member that has an inner annular surface surrounding an axis to define a mounting space. The fixed seat is made of metal materials, is formed in a shape of a hollow cylinder that surrounds the axis, is fixedly mounted within the mounting space, and has an outer annular surface that abuts against the inner annular surface of the base. The motor unit includes a case body, a stator, a rotor and an impeller. The case body is disposed on the base. The stator is sleeved on the case body and is disposed within the mounting space. The rotor is disposed within the case body. The impeller is connected to the rotor. The motor cover is disposed on the base and covers the impeller. The heat-dissipating cover is disposed on the covering member of the base. The fixed seat and the motor unit are positioned relative to the base along the axis by the heat-dissipating cover.

Because the fixed seat is made of metal materials, the fixed seat has relatively high structural strength and is capable of withstanding heat generated by the stator during operation. However, the heat may not be effectively dissipated because the outer annular surface of the fixed seat and the inner annular surface of the base closely abut against each other.

SUMMARY

Therefore, an object of the disclosure is to provide a canned motor device that can alleviate the drawback of the prior art.

According to the disclosure, the canned motor device includes a base, a fixed seat, a motor unit and a motor cover. The base is made of a plastic material, is formed in a shape of a hollow cylinder that surrounds an axis, and has a first end surface, a second end surface and an inner base surface. The second end surface is opposite to the first end surface along the axis. The inner base surface surrounds the axis, interconnects the first end surface and the second end surface, and defines an accommodating space. The fixed seat is made of an aluminum alloy, is formed in a shape of a hollow cylinder that surrounds the axis (L), is disposed in the accommodating space, and has an inner seat surface, an outer seat surface, a plurality of recesses and a plurality of first heat-dissipating fins. The inner seat surface surrounds the axis and defines an inner space. The outer seat surface surrounds and corresponds in position to the inner seat surface, and cooperates with the inner base surface of the base to define at least one gap therebetween. The recesses are indented from the outer seat surface and extend toward the inner seat surface. Each of the first heat-dissipating fins is located between two adjacent ones of the recesses. The motor unit includes a case body, a stator, a rotor and an impeller. The case body is disposed on the base. The stator is sleeved on the case body and is disposed in the accommodating space. The rotor is disposed in the case body. The impeller is connected to the rotor. The motor cover is disposed on the first end surface of the base and covers the impeller.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
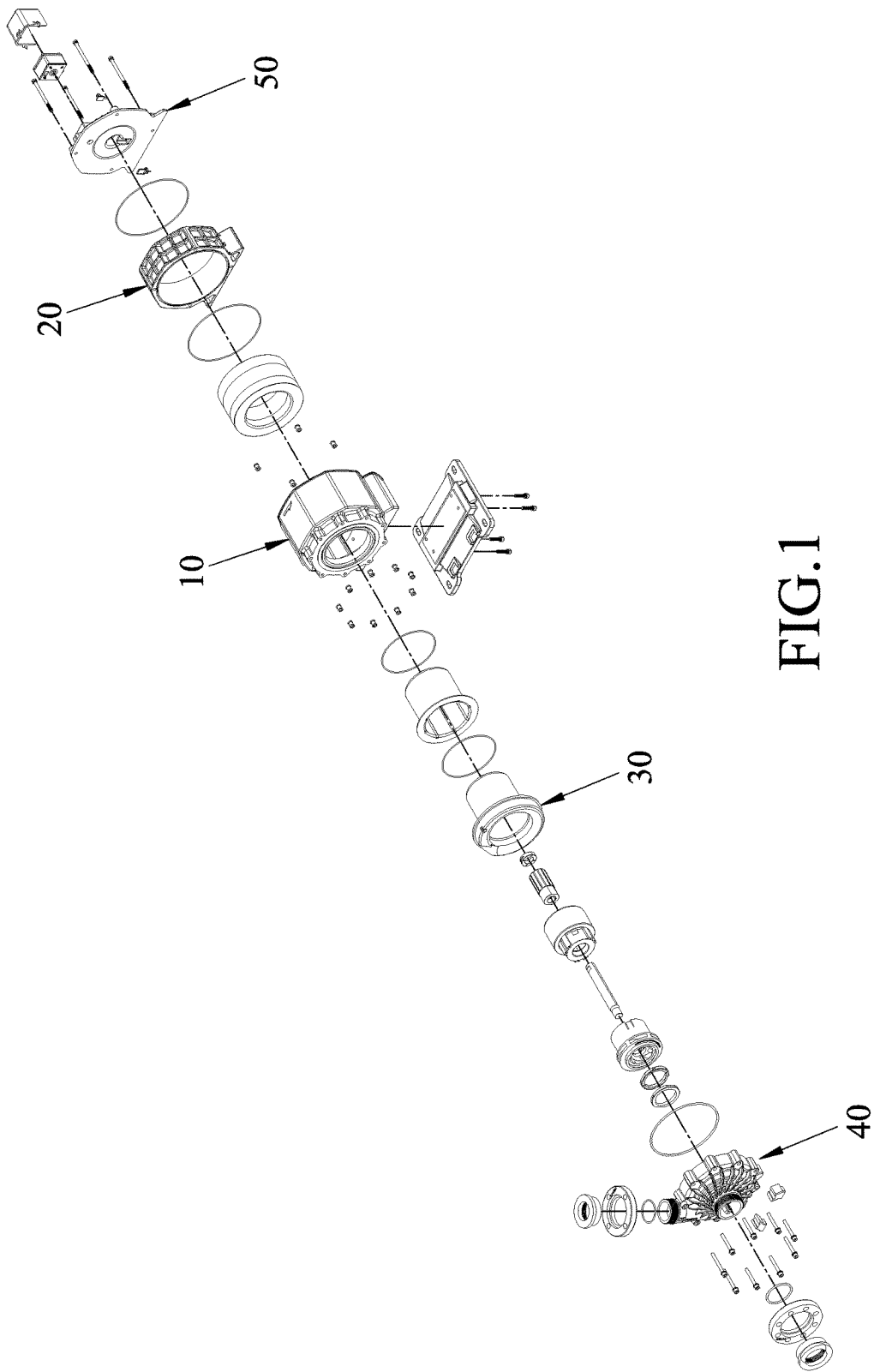
FIG. 1 is an exploded perspective view of an embodiment of a canned motor device according to the disclosure.
Figure 3:
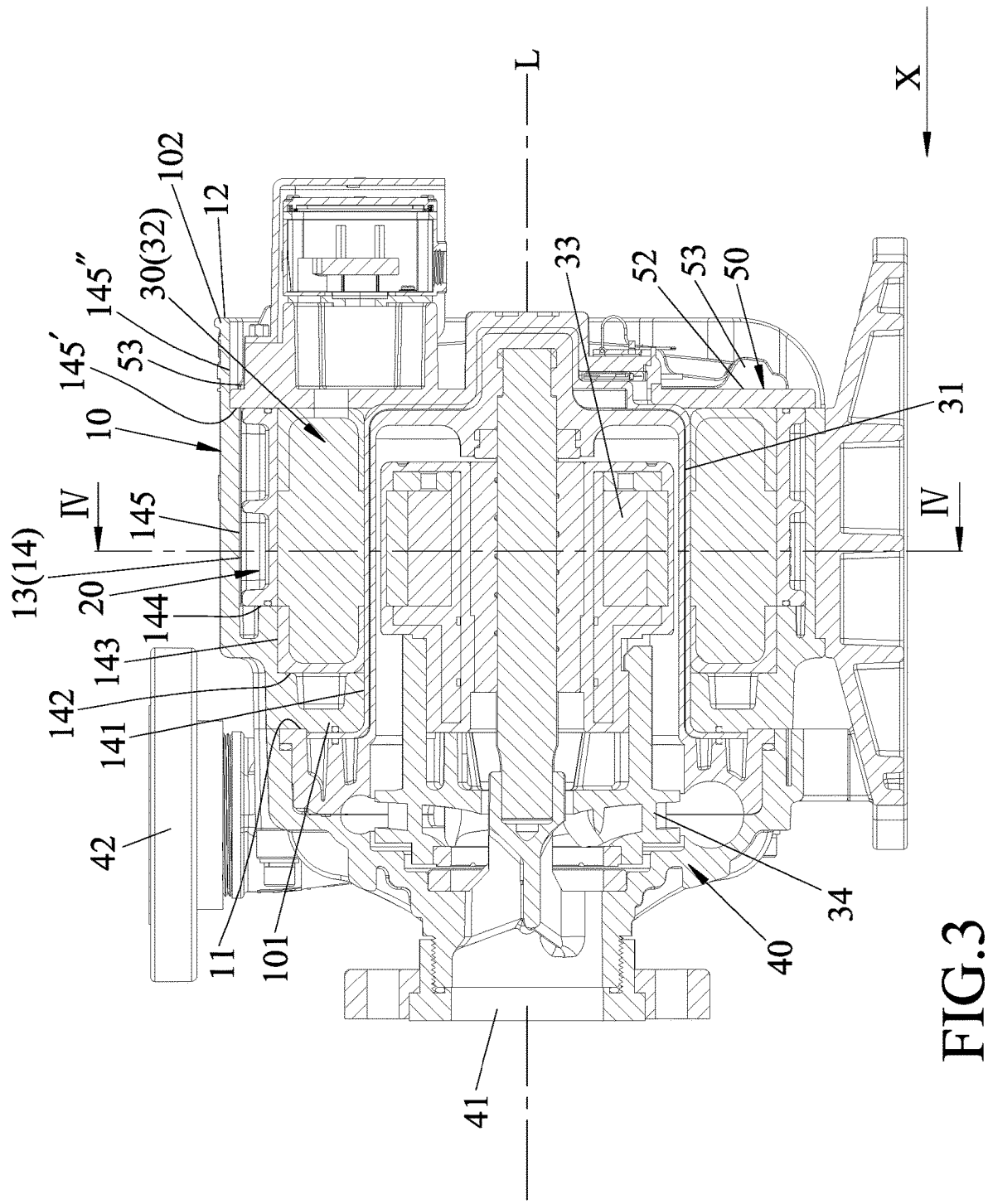
FIG. 3 is a sectional view of the embodiment.
Figure 5:
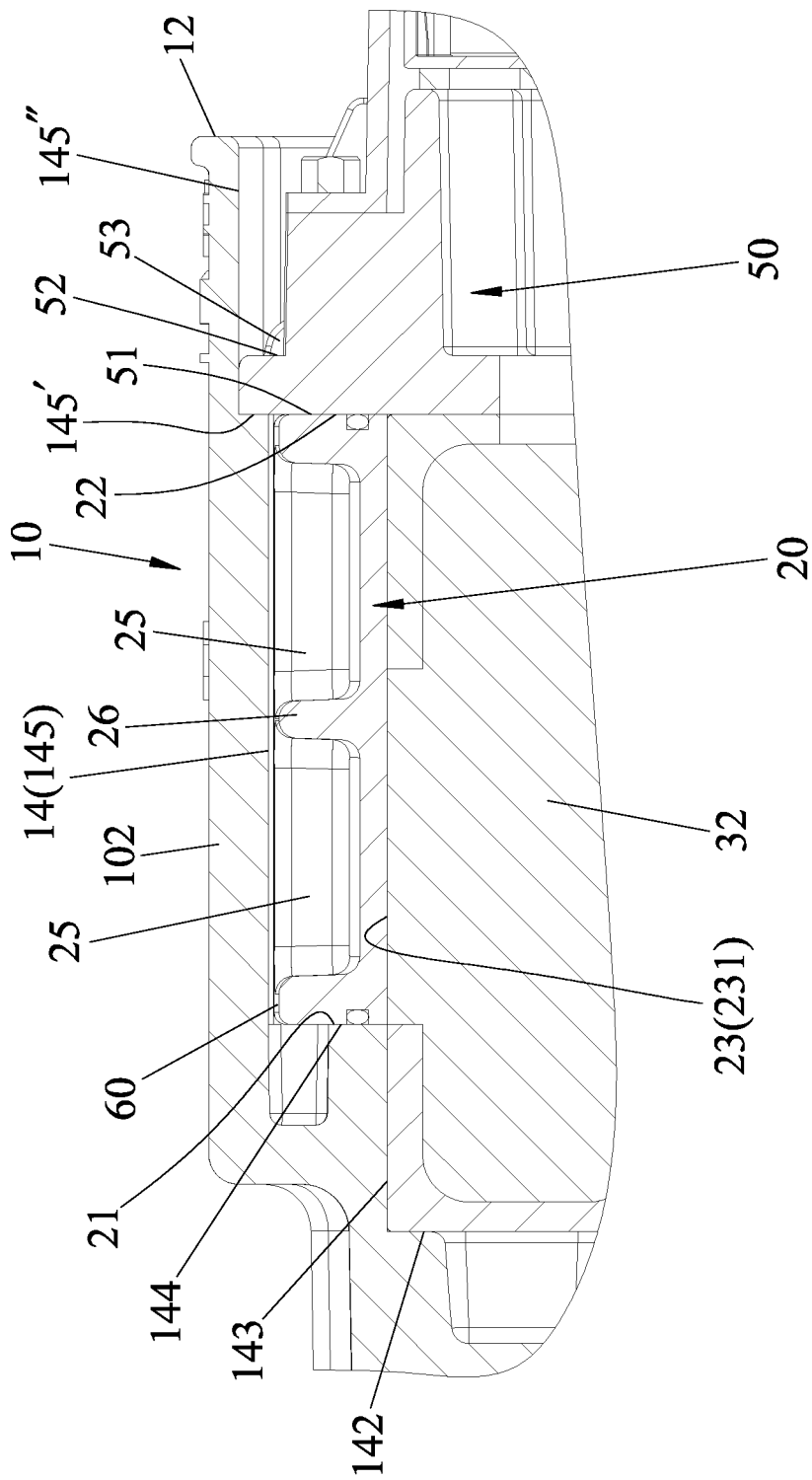
FIG. 5 is a fragmentary, enlarged view of FIG. 3.

Referring to FIGS. 1, 3 and 5, an embodiment of a canned motor device according to the disclosure includes a base 10, a fixed seat 20, a motor unit 30, a motor cover 40 and a heat-dissipating cover 50.

The base 10 is made of a plastic material and is formed in a shape of a hollow cylinder that surrounds an axis (L). In this embodiment, the plastic material may be an engineering plastic with acid and alkali resistance, such as polypropylene (PP), glass fiber reinforced polypropylene (GFRPP), polyvinylidene difluoride (PVDF) and carbon fiber filled ethylene tetrafluoroethylene (CFRETFE). The base 10 includes a main body member 101 and a covering member 102 that are arranged in a direction (X) of the axis (L). The covering member 102 is connected to the main body member 101. The base 10 has a first end surface 11, a second end surface 12 and an inner base surface 14. The first end surface 11 is located on one side of the main body member 101 opposite to the covering member 102. The second end surface 12 is located on one side of the covering member 102 opposite to the first end surface 11 along the axis (L). The inner base surface 14 surrounds the axis (L), interconnects the first end surface 11 and the second end surface 12, and defines an accommodating space 13.

Figure 4:
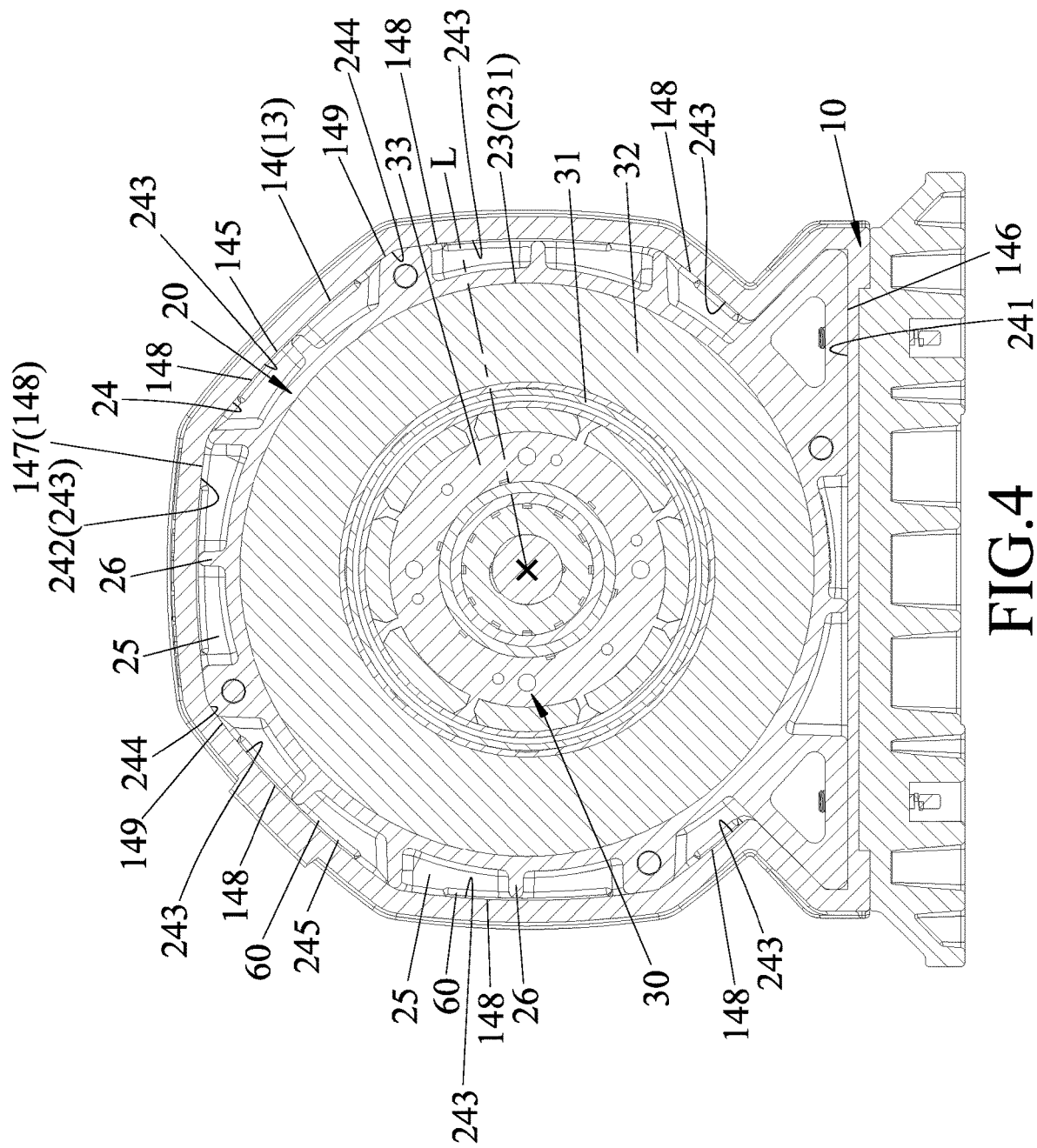
FIG. 4 is a sectional view taken long line IV-IV in FIG. 3.

The inner base surface 14 of the base 10 has a stepped profile, and has a first axial segment 141, a second axial segment 143, a third axial segment 145, a fourth axial segment 145", a first abutting part 142, a second abutting part 144 and a third abutting part 145'. The first axial segment 141 is connected to the first end surface 11. Each of the first axial segment 141, the second axial segment 143, the third axial segment 145 and the fourth axial segment 145" extends substantially in the direction (X) of the axis (L). Each of the first abutting part 142, the second abutting part 144 and the third abutting part 145' extends substantially perpendicularly to the axis (L). The first abutting part 142, the second abutting part 144 and the third abutting part 145' respectively interconnect the first axial segment 141 and the second axial segment 143, the second axial segment 143 and the third axial segment 145, and the third axial segment 145 and the fourth axial segment 145". The fourth axial segment 145" is connected to the second end surface 12. In this embodiment, the first abutting part 142, the second abutting part 144 and the third abutting part 145' face away from the first end surface 11. Referring to FIG. 4, a cross section of a space defined by the third axial segment 145 that is perpendicular to the axis (L) is non-circular. The third axial segment 145 has a base dovetail region 146, and a base multi-corner region 147 connected to the base dovetail region 146. The base multi-corner region 147 has a plurality of inner edge parts 148. In this embodiment, the base multi-corner region 147 has seven inner edge parts 148. Any two adjacent ones of the inner edge parts 148 define an inner corner part 149 therebetween.

Figure 2:
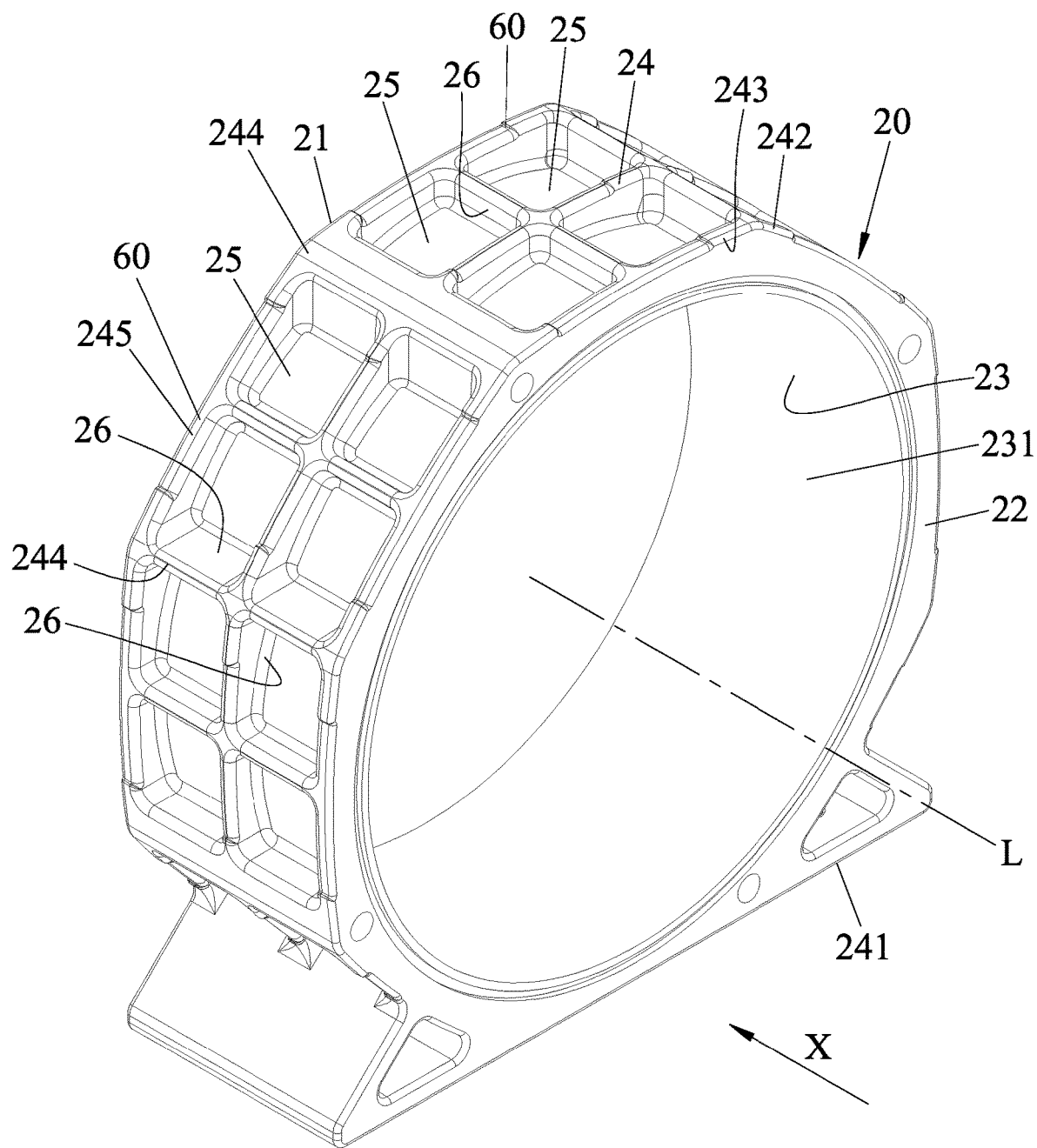
FIG. 2 is a perspective view of a fixed seat of the embodiment.

Referring further to FIG. 2, the fixed seat 20 is made of an aluminum alloy, is formed in a shape of a hollow cylinder that surrounds the axis (L), is non-rotatably disposed in the accommodating space 13 of the base 10, and has an inner seat surface 23, an outer seat surface 24, a plurality of recesses 25 and a plurality of first heat-dissipating fins 26. The fixed seat 20 further has a first seat surface 21 that abuts against the second abutting segment 144 of the inner base surface 14, and a second seat surface 22 that is opposite to the first seat surface 21 along the axis (L). The inner seat surface 23 interconnects the first seat surface 21 and the second seat surface 22, surrounds the axis (L) and defines an inner space 231. The outer seat surface 24 surrounds and corresponds in position to the inner seat surface 23, and cooperates with the inner base surface 14 of the base 10 to define at least one gap 60 therebetween. In this embodiment, the outer seat surface 24 cooperates with the inner base surface 14 to define a plurality of gaps 60 therebetween. The recesses 25 are indented from the outer seat surface 24 and extend toward the inner seat surface 23. The first heat-dissipating fins 26 are each located between two adjacent ones of the recesses 25. A cross section of the fixed seat 20 perpendicular to the axis (L) is non-circular and has a shape corresponding to the shape of the cross section of the space defined by the third axial segment 145. The outer seat surface 24 has a seat dovetail region 241, and a seat multi-corner region 242 connected to the seat dovetail region 241. The seat multi-corner region 242 has a plurality of outer edge parts 243 at which the recesses 25 are formed. In this embodiment, the seat multi-corner region 242 has seven outer edge parts 243. The outer edge parts 243 respectively face the inner edge parts 148 of the inner base surface 14. Any two adjacent ones of the outer edge parts 243 define an outer corner part 244 therebetween. Each of the outer edge parts 243 cooperates with the respective one of the inner edge parts 148 of the third axial segment 145 to define one of the gaps 60 therebetween. Each of the gaps 60 extends in the direction (X) of the axis (L). At least one of the first heat-dissipating fins 26 is located between two adjacent ones of the recesses 25 respectively formed at two adjacent ones of the outer edge parts 243. In this embodiment, each of the outer edge parts 243 is recessed with a shallow groove 245 extending in the direction (X) of the axis (L) to serve as the respective one of the gaps 60. That is to say, each of the gaps 60 is formed in the respective one of the outer edge parts 243. The depth of each of the shallow grooves 245 in a radial direction transverse to the axis (L) is substantially 1 millimeter. In this embodiment, each of the shallow grooves 245 extends through two opposite end surfaces of the fixed seat 20 along the axis (L).

The motor unit 30 includes a case body 31, a stator 32, a rotor 33 and an impeller 34. The case body 31 is disposed on the base 10. The stator 32 is sleeved on the case body 31, is disposed in the accommodating space 13, and has two stator end surfaces each perpendicular to the axis (L), and an outer stator surface interconnecting the stator end surfaces. Specifically, the stator 32 is partly disposed in the inner space 231 of the fixed seat 20, abuts against the first abutting part 142 of the inner base surface 14 with one of the stator end surfaces thereof, and abuts against the second axial segment 143 and the inner seat surface 23 of the fixed seat 20 with the outer stator surface thereof. The rotor 33 is disposed in the case body 31. The impeller 34 is connected to the rotor 33. Since the relevant features of this disclosure do not concern the specific configuration of the motor unit 30, further details of the same are omitted herein for the sake of brevity.

The motor cover 40 is disposed on the first end surface 11 of the base 10 and covers the impeller 34. Specifically, the motor cover 40 is fixedly mounted to the first end surface 11 by a plurality of screws, and has an intake opening 41 at an end thereof along the axis (L), and an exit opening 42 located at one side of the intake opening 41 that is the same as the impeller 34 and extending along a tangent line (not shown) to the outer periphery of the impeller.

The heat-dissipating cover 50 is made of an aluminum alloy, is disposed on the base 10, has a first cover surface 51 and a second cover surface 52, and includes a plurality of outer heat-dissipating fins 53. The first cover surface 51 and the second cover surface 52 are respectively located at two opposite sides of the heat-dissipating cover 50 in the direction (X) of the axis (L). The outer heat-dissipating fins 53 protrude from the second cover surface 52 and away from the first cover surface 51. The first cover surface 51 abuts against the third abutting part 145' of the inner base surface 14, the second seat surface 22 of the fixed seat 20 and the other one of the stator end surfaces of the stator 32. The heat-dissipating cover 50 corresponds in position to the fourth axial segment 145" of the inner base surface 14 and is surrounded by the covering member 102 (i.e., the heat-dissipating cover 50 is located in the base 10).

In the following description, the advantages provided by the structures of the embodiment of the canned motor device of the disclosure are described.

When the stator 32 of the motor unit 30 is energized, the rotor 33 of the motor unit 30 is driven by the stator 32 to rotate and to further drive the impeller 34 of the motor unit 30 to co-rotate so that the embodiment may pump liquid in a manner that the liquid is moved into the canned motor device through the intake opening 41 and are moved toward the exit opening 42 by the impeller 34 to exit the canned motor device through the exit opening 42.

When the motor unit is in operation, heat is generated by the stator 32 and then conducted to the fixed seat 20. By virtue of each of the first heat-dissipating fins 26 located between two adjacent ones of the recesses 25 that are indented from the outer seat surface 24 of the fixed seat 20, the fixed seat 20 has a relatively large surface area to dissipate the heat to the gaps 60. By virtue of the gaps 60 between the outer seat surface 24 and the inner base surface 14, the heat dissipated by the recesses 25 and the first heat-dissipating fins 26 will be transferred to the heat-dissipating cover 50 through the gaps 60, and then be dissipated to the external environment through the outer heat-dissipating fins 53 of the heat-dissipating cover 50. Moreover, because the first cover surface 51 of the heat-dissipating cover 50 abuts the other one of the stator end surfaces of the stator 32, the heat generated by the stator 32 may be dissipated directly by the heat-dissipating cover 50. Therefore, heat-dissipation efficiency of the embodiment is relatively high.

In addition, the recesses 25 that are indented from the outer seat surface 24 of the fixed seat 20 reduces the weight of the fixed seat 20 so that the embodiment may be lightweight.

Overall, the canned motor device of the disclosure offers a design that is easy to assemble while providing enhanced heat-dissipation efficiency.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
    a base made of a plastic material, formed in a shape of a hollow cylinder that surrounds an axis, and having
        a first end surface,
        a second end surface that is opposite to said first end surface along the axis, and
        an inner base surface that surrounds the axis, that interconnects said first end surface and said second end surface, and that defines an accommodating space;
    a fixed seat made of an aluminum alloy, formed in a shape of a hollow cylinder that surrounds the axis, disposed in said accommodating space, and having
        an inner seat surface that surrounds the axis and that defines an inner space,
        an outer seat surface that surrounds and corresponds in position to said inner seat surface, and that cooperates with said inner base surface of said base to define at least one gap therebetween,
        a plurality of recesses indented from said outer seat surface and extending toward said inner seat surface, and
        a plurality of first heat-dissipating fins each being located between two adjacent ones of said recesses;
    a motor unit including
        a case body that is disposed on said base,
        a stator that is sleeved on said case body and that is disposed in said accommodating space,
        a rotor that is disposed in said case body, and
        an impeller that is connected to said rotor;
    a motor cover disposed on said first end surface of said base and covering said impeller; and
    a heat-dissipating cover made of an aluminum alloy, disposed on said base, having a first cover surface and a second cover surface that are respectively located at two opposite sides of said heat-dissipating cover in a direction of the axis, and including a plurality of outer heat-dissipating fins that protrude from said second cover surface and away from said first cover surface, said first cover surface abutting against said fixed seat
    wherein said inner base surface of said base has a stepped profile, and has
        a first axial segment connected to said first end surface and extending substantially in the direction of the axis,
        a second axial segment extending substantially in the direction of the axis,
        a third axial segment extending substantially in the direction of the axis,
        a fourth axial segment extending substantially in the direction of the axis and connected to said second end surface,
        a first abutting part extending substantially perpendicular to the axis and interconnecting said first axial segment and said second axial segment,
        a second abutting part extending substantially perpendicular to the axis and interconnecting said second axial segment and said third axial segment, and
        a third abutting part extending substantially perpendicular to the axis and interconnecting said third axial segment and said fourth axial segment
    wherein said stator abuts against said first abutting part and said first cover surface of said heat-dissipating cover;
    wherein said fixed seat abuts against said second abutting part and said first cover surface; and
    wherein said at least one gap is formed between said outer seat surface and said third axial segment.

2. The canned motor device as claimed in claim 1, wherein:
    said third axial segment of said inner base surface has a base dovetail region and a base multi-corner region connected to said base dovetail region, said base multi-corner region having a plurality of inner edge parts, any two adjacent ones of said inner edge parts defining an inner corner part therebetween;
    said outer seat surface cooperates with said inner base surface of said base to define a plurality of said gap therebetween;
    said outer seat surface of said fixed seat has a seat dovetail region and a seat multi-corner region connected to said seat dovetail region, said seat multi-corner region having a plurality of outer edge parts at which said recesses are formed, said outer edge parts respectively facing said inner edge parts, any two adjacent ones of said outer edge parts defining an outer corner part therebetween, each of said outer edge parts cooperating with the respective one of said inner edge parts of said third axial segment to define one of said gaps therebetween;
    each of said gaps extends in the direction (X) of the axis; and
    at least one of said first heat-dissipating fins is located between two adjacent ones of said recesses respectively formed at two adjacent ones of said outer edge parts.

3. The canned motor device as claimed in claim 2, wherein each of said gaps is formed in the respective one of said outer edge parts of said fixed seat.

* * * * *